(12) United States Patent
Wang et al.

(10) Patent No.: US 11,124,224 B2
(45) Date of Patent: Sep. 21, 2021

(54) ELECTRIC POWER STEERING SYSTEM

(71) Applicant: HIWIN TECHNOLOGIES CORP., Taichung (TW)

(72) Inventors: Eric Wang, Taichung (TW); Yi-Wei Liao, Taichung (TW); Cheng-Che Ho, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 189 days.

(21) Appl. No.: 16/698,892

(22) Filed: Nov. 27, 2019

(65) Prior Publication Data
US 2021/0155284 A1 May 27, 2021

(51) Int. Cl.
*B62D 5/04* (2006.01)

(52) U.S. Cl.
CPC ......... *B62D 5/0448* (2013.01); *B62D 5/0406* (2013.01); *B62D 5/0421* (2013.01); *B62D 5/0463* (2013.01)

(58) Field of Classification Search
CPC .. B62D 5/0448; B62D 5/0406; B62D 5/0421; B62D 5/0463; B62D 5/046
See application file for complete search history.

(56) References Cited

U.S. PATENT DOCUMENTS

| 5,299,649 | A * | 4/1994 | Sano | F16H 25/2056 180/400 |
| 6,778,063 | B1 * | 8/2004 | Chen | G01D 11/24 338/116 |
| 6,823,245 | B2 * | 11/2004 | Sugitani | B60T 8/172 340/438 |
| 6,972,537 | B2 * | 12/2005 | Nagase | B62D 5/046 318/432 |
| 7,009,349 | B2 * | 3/2006 | Nagase | B62D 5/0484 318/133 |
| 7,239,104 | B2 * | 7/2007 | Heilig | B62D 5/0463 318/561 |
| 7,477,026 | B2 * | 1/2009 | Ozsoylu | B62D 5/00 180/444 |

(Continued)

FOREIGN PATENT DOCUMENTS

| CN | 104210544 A | 12/2014 |
| DE | 698 14 566 T2 | 3/2004 |

(Continued)

*Primary Examiner* — Minnah L Seoh
*Assistant Examiner* — Michael R Stabley
(74) *Attorney, Agent, or Firm* — Winston Hsu

(57) ABSTRACT

An electric power steering system includes a housing, a ball screw, a motor, an angular position sensor and a computing unit. The ball screw includes a nut and a threaded shaft. The motor is disposed in the housing and connected to the nut and includes a bushing and a metal component. The metal component is fixed on the bushing and includes a central portion, a first wing portion and a second wing portion. The first wing portion and the second wing portion are disposed on an outer circumferential surface of the central portion. The angular position sensor is disposed in the housing and fixed relative to the housing. The angular position sensor includes a first sensing unit and a second sensing unit. The computing unit is electrically connected to the first sensing unit and the second sensing unit.

7 Claims, 12 Drawing Sheets

(56) References Cited

U.S. PATENT DOCUMENTS

| | | | | |
|---|---|---|---|---|
| 8,418,577 B2* | 4/2013 | Asakura | ............... | F16H 25/2233 |
| | | | | 74/424.81 |
| 8,725,354 B2* | 5/2014 | Oblizajek | ................ | B62D 5/04 |
| | | | | 701/41 |
| 8,875,835 B2* | 11/2014 | Fujinori | ................... | B62D 3/06 |
| | | | | 180/445 |
| 9,393,483 B2* | 7/2016 | Tan | ........................ | A63C 17/12 |
| 9,694,847 B2* | 7/2017 | Yoshida | .................. | G01L 5/221 |
| 10,155,532 B2* | 12/2018 | Farrelly | .................... | G01L 5/22 |
| 2003/0006088 A1 | 1/2003 | Parker | | |
| 2004/0257071 A1* | 12/2004 | Chen | ...................... | G01D 5/145 |
| | | | | 324/207.25 |
| 2018/0015944 A1* | 1/2018 | Knoll | .................. | B62D 5/0409 |
| 2018/0208239 A1 | 7/2018 | Farrelly | | |
| 2019/0077444 A1 | 3/2019 | Kim | | |
| 2020/0114952 A1* | 4/2020 | Mayer | ................. | B62D 5/0463 |

FOREIGN PATENT DOCUMENTS

| | | |
|---|---|---|
| JP | 11-64039 A | 3/1999 |
| JP | 2000-318627 A | 11/2000 |
| JP | 2002-333303 A | 11/2002 |
| JP | 2004-317296 A | 11/2004 |
| JP | 2008-197046 A | 8/2008 |
| JP | 2008-215835 A | 9/2008 |
| JP | 2008-309736 A | 12/2008 |
| JP | 2014-5885 A | 1/2014 |
| JP | 2017-165266 A | 9/2017 |
| WO | 2016/050382 A1 | 4/2016 |

\* cited by examiner

ELECTRIC POWER STEERING SYSTEM

BACKGROUND OF THE INVENTION

1. Field of the Invention

The present disclosure relates to an electric power steering system, and more particularly, to an electric power steering system which can calculate a position of the threaded shaft via an angular position sensor disposed on the motor.

2. Description of the Prior Art

An electric power steering (EPS) system is a power steering system provided with an assisted torque by an electric motor. The EPS system is mainly consisted of a assistive motor, a sensor, a deceleration mechanism and a controller, and can be mainly divided into three categories according to the installing position of the assistive motor-a column EPS (also called a C-type EPS), a pinion EPS (also called a P-type EPS) and a rack EPS (also called a R-type EPS). The rack EPS can be classified into direct-drive type EPS and indirect-drive type EPS according to the way that the assistive motor drives the rack of the deceleration mechanism or the threaded shaft. Comparing to a traditional hydraulic power steering system, the EPS system is capable of adjusting the rotational speed of the motor when the speed of the vehicle is changed, such that an optimal steering assistance can be provided, and both the convenience at low speed and the stability at high speed can be maintained. Furthermore, due to the omission of components, such as the oil pump and hydraulic oil pipe, the EPS system can be applied to a variety of vehicles, and has become the development focus and used widely.

In the EPS system, how to determine the absolute steering angle of the vehicle is an important issue. For example, Chinese patent with No. 103171616B discloses an EPS system, which includes a first rotor connected to an input shaft, a second rotor connected to an output shaft, and a first angle element for measuring an absolute angle of the first rotor, and a second angle element and a third angle element for measuring an relative angle of the first rotor and an electronic control unit. The electronic control unit obtains a reference angle based on the absolute angle and the relative angle, and obtains a first absolute angle and a second absolute angle via tracking and accumulating the relative angle of the second angle element and the third angle element, and the absolute steering angle of the vehicle is calculated based on the first absolute angle and the second absolute angle.

Moreover, Chinese patent with No. 106068219B discloses an EPS device capable of detecting the steering angle, which includes a steering shaft, a torque sensor disposed on the steering shaft for measuring a torque of the steering wheel, and an angular position sensor disposed on the motor. The steering shaft and the motor are connected by a worm gear and worm, and the steering angle of vehicle is calculated via a vernier algorithm and an angle follower algorithm.

However, with the development of the advanced driver assistance system (ADAS) and the unmanned autonomous driving technology, the steering wheel and the steering column have become unnecessary components. For reducing the mechanism volume and the cost, more and more developers remove the input shaft assembly and the torque sensor from the EPS system and change to electrical control. In the situation, how to obtain the absolute steering angle of the vehicle or the position of the output shaft (threaded shaft) becomes a problem that needs to be solved once again. Furthermore, for being applied to different kinds of vehicles, the developers also aim to reduce the number of the components of the deceleration mechanism and the transmission mechanism, such that it can prevent the reliability of the calculated steering angle of the vehicle or the position of the output shaft from being affected by the aging of the components or the interference between components. However, in the aforementioned patent, the steering wheel and steering column are necessary components, and the sensor for sensing the steering angle is disposed on the steering column. Therefore, a reserved space for disposing the sensor is required by the housing which accommodating the steering column. As a result, the overall system is bulky, and thus cannot be applied to various vehicles. Furthermore, when assembling the EPS device of the aforementioned patent, the assembling procedure has more steps and is more complicated due to the structure and the mutual arrangement of the steering column and the sensor. As such, the assembling convenience is reduced, and the assembling time and production cost are increased.

SUMMARY OF THE INVENTION

According to an embodiment of the present disclosure, an electric power steering system includes a housing, a ball screw, a motor, an angular position sensor and a computing unit. The ball screw includes a nut and a threaded shaft, wherein the threaded shaft is moved along an axial direction through the nut being rotated. The motor is disposed in the housing and connected to the nut. The motor is configured to drive the nut to rotate. The motor includes a bushing and a metal component. The bushing is disposed on the threaded shaft and moved synchronously with the nut. The metal component is fixed on the bushing. The metal component includes a central portion, a first wing portion and a second wing portion. The first wing portion and the second wing portion are disposed on an outer circumferential surface of the central portion. The angular position sensor is disposed in the housing and fixed relative to the housing. The angular position sensor includes a first sensing unit and a second sensing unit. The first sensing unit has a first through hole corresponding to the first wing portion. The second sensing unit has a second through hole corresponding to the second wing portion. The computing unit is electrically connected to the first sensing unit and the second sensing unit. An outer diameter of the central portion is less than a hole diameter of the first through hole, and the outer diameter of the central portion is less than a hole diameter of the second through hole, such that the central portion is disposed in the first through hole and the second through hole. When the electric power steering system is turned on, the first sensing unit and the second sensing unit sense a rotating angle of the motor and respectively output a first sensing signal and a second sensing signal to the computing unit, and the computing unit calculates a position of the threaded shaft along the axial direction based on the first sensing signal and the second sensing signal.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the disclosure may be practiced. In this regard, directional terminology, such as top, bottom, left, right, front or back, is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein is for the purpose of description and should not be regarded as limiting. The use of "including" Also, it is" Also, it is to be understood that the phraseology and terminology used herein is for the purpose of description and should not be regarded as limiting. The use of "including structural chang" Also, it is to be unations thereof herein is mare used broadly and encompass direct and indirect connections and installations. Accordingly, the drawings and descriptions will be regarded as illustrative in nature and not as restrictive.

Figure 1:
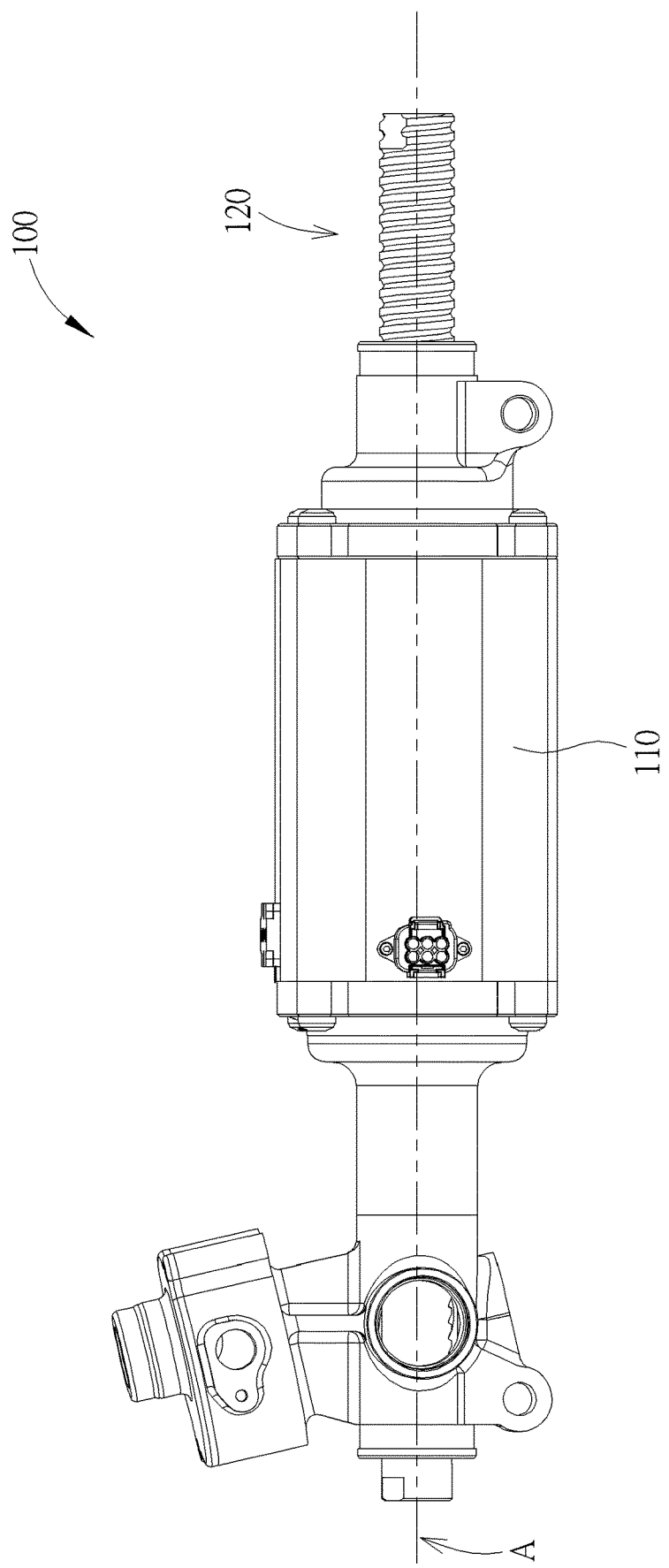
FIG. 1 is a schematic diagram showing an electric power steering system according to one embodiment of the present disclosure.
Figure 2:
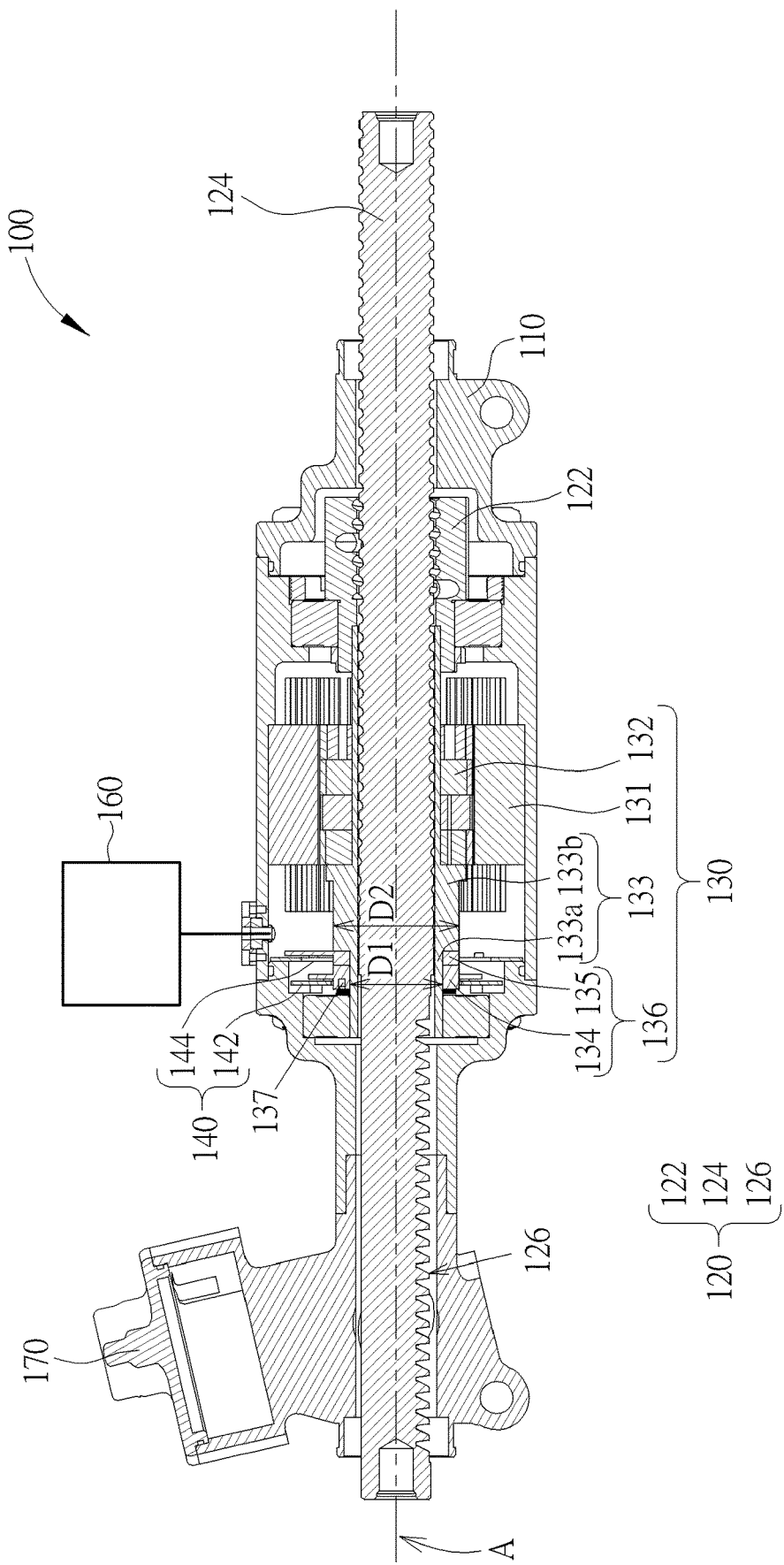
FIG. 2 is a cross-sectional view of the electric power steering system shown in FIG. 1 along an axial direction.
Figure 3:
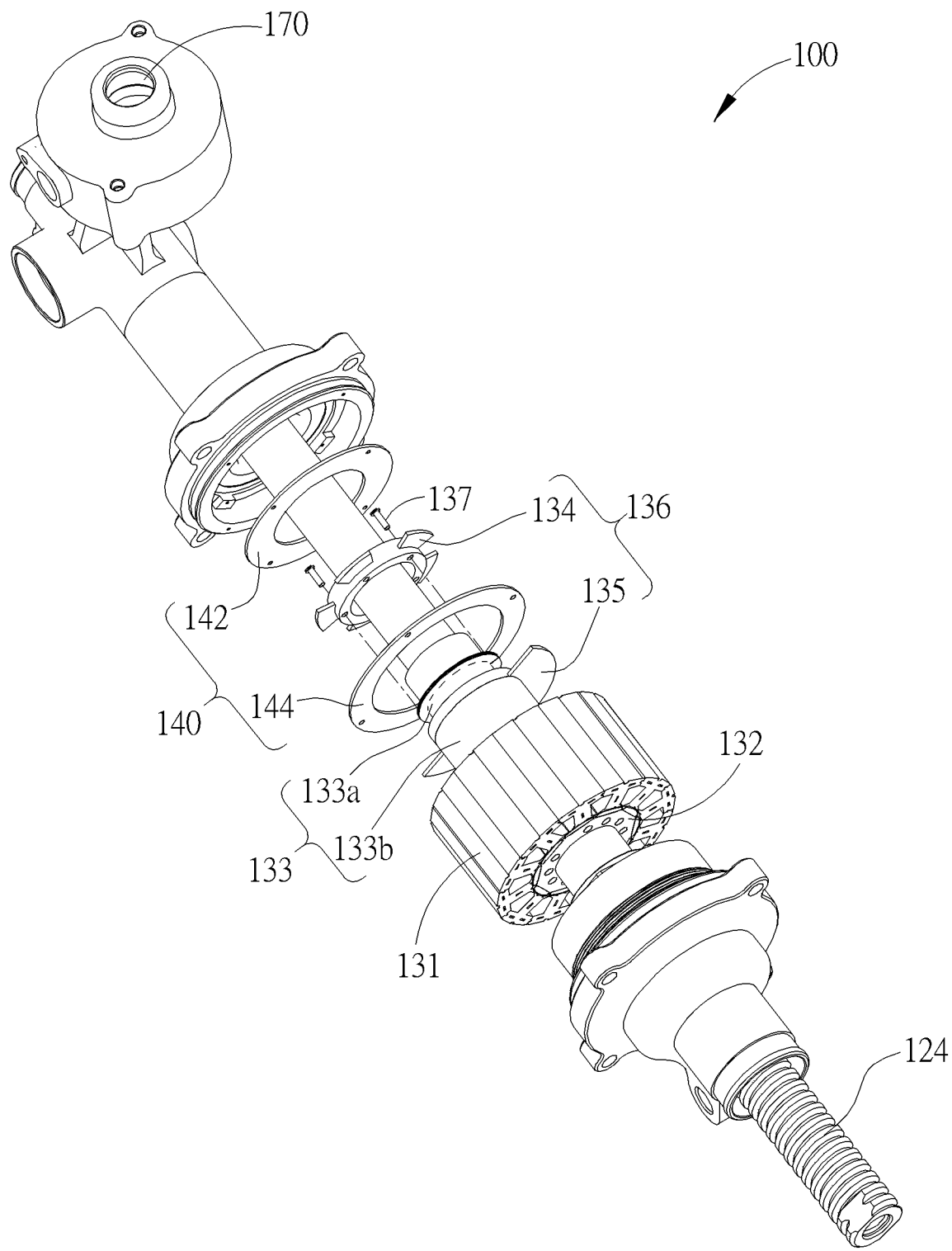
FIG. 3 is a schematic diagram showing internal components of the electric power steering system shown in FIG. 1 by removing a partial of a housing.

Please refer to FIG. 1 to FIG. 3. FIG. 1 is a schematic diagram showing an electric power steering system 100 according to one embodiment of the present disclosure. FIG. 2 is a cross-sectional view of the electric power steering system 100 shown in FIG. 1 along an axial direction A. FIG. 3 is a schematic diagram showing internal components of the electric power steering system 100 shown in FIG. 1 by removing a partial of a housing 110, and the internal components in FIG. 3 are shown in an exploded state. In the embodiment, the electric power steering system 100 includes a housing 110, a ball screw 120, a motor 130, an angular position sensor 140 and a computing unit 160. The ball screw 120 includes a nut 122 and a threaded shaft 124. The threaded shaft 124 is moved along an axial direction A through the nut 122 being rotated. The motor 130 is disposed in the housing 110 and connected to the nut 122. The motor 130 is configured to drive the nut 122 to rotate. The angular position sensor 140 is disposed in the housing 110 and fixed relative to the housing 110. The angular position sensor 140 includes a first sensing unit 142 and a second sensing unit 144. The computing unit 160 is electrically connected to the first sensing unit 142 and the second sensing unit 144.

Specifically, the threaded shaft 124 is an output shaft that is connected to a wheel of a vehicle. The electric power steering system 100 further includes an input shaft 170 connected to a steering wheel for providing a steering torque. The input shaft 170 is engaged with the threaded shaft 124 through a rack portion 126 of the ball screw 120. For example, the input shaft 170 can be arranged with a pinion and coupled to the rack portion 126 through a tooth structure of the pinion. Moreover, the electric power steering system 100 can determine an absolute steering angle of the vehicle by changing a position of the output shaft along the axial direction A. Specifically, the nut 122 is threadedly connected to the threaded shaft 124 through a plurality of rolling members (not shown). When the nut 122 is rotated, the threaded shaft 124 is driven to move along the axial direction A through the plurality of rolling members. The actuation principle of the ball screw 120 is well known in the art, which is not described herein.

In the embodiment, the motor 130 includes a stator 131, a rotor 132, a bushing 133 and a metal component 136. The stator 131 is fixed relative to the housing 110. The bushing 133 is disposed on the threaded shaft 124 and moved synchronously with the nut 122. The metal component 136 is fixed on the bushing 133. The metal component 136 includes a first metal member 134 and a second metal member 135. The rotor 132, the bushing 133, the metal component 136 and the nut 122 are coaxial and moved synchronously with each other. The stator 131, the rotor 132, the bushing 133 and the metal component 136 are all disposed in the housing 110. When the electric power steering system 100 is turned on, the rotor 132 rotates relative to the stator 131 and drives the bushing 133 and the nut 122 to rotate together, such that the threaded shaft 124 is moved along the axial direction A so as to turn the vehicle.

In the embodiment, the motor 130 is a hollow torque motor. Since the axial portion is hollow, the nut 122 can be directly driven by the rotor 132 and thus a deceleration mechanism is not required. Accordingly, the abrasion and power loss caused by the gear transmission can be prevented. Furthermore, the threaded shaft 124 is directly disposed through the rotor 132, the bushing 133 and the nut 122, and the rotor 132 and the nut 122 are coaxial and moved synchronously. Accordingly, the rotation smoothness of the nut 122 can be enhanced. Moreover, the angular position sensor 140 is disposed in housing 110, and thus an extra angular position sensor disposed on the input shaft 170 is not required, which can reduce the cost significantly. Furthermore, the input shaft 170 can be omitted, which is beneficial to the development of autonomous vehicles.

Figure 4:
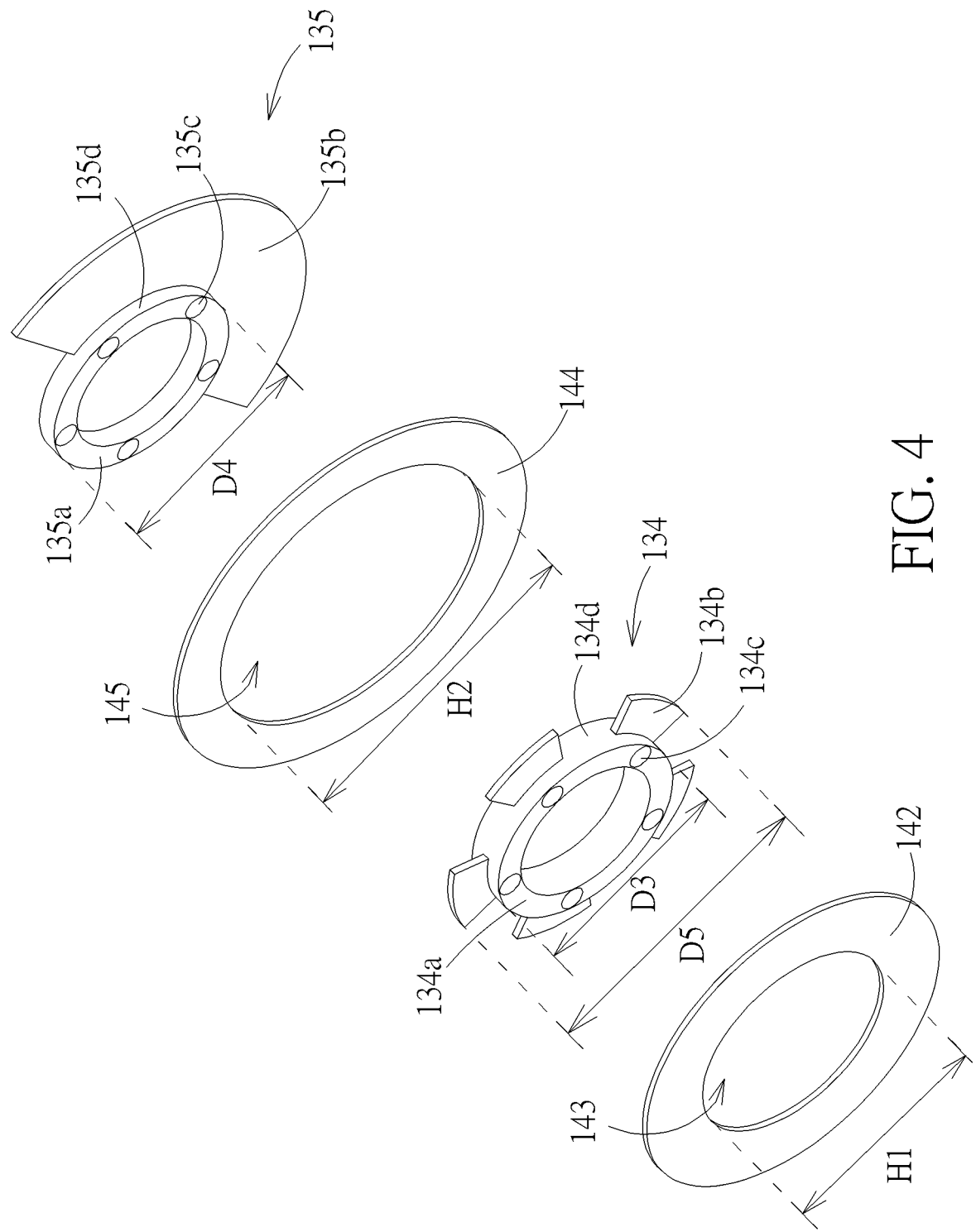
FIG. 4 is a schematic diagram showing a first sensing unit, a second sensing unit, a first metal member and a second metal member shown in FIG. 3.

Please refer to FIG. 2 to FIG. 4. FIG. 4 is a schematic diagram showing the first sensing unit 142, the second sensing unit 144, the first metal member 134 and the second metal member 135 shown in FIG. 3. In the embodiment, the metal component 136 includes the first metal member 134 and the second metal member 135. The first metal member 134 and the second metal member 135 are fixed on the bushing 133. Specifically, the bushing 133 includes a first portion 133a and a second portion 133b. An outer diameter D1 of the first portion 133a is less an outer diameter D2 of the second portion 133b. The first metal member 134 and the second metal member 135 are stacked along the axial direction A and are fixed on the second portion 133b through at least one fastening element 137. The first metal member 134 and the second metal member 135 surround the first portion 133a. More specifically, the number of fastening elements 137 can be plural, and the fastening elements 137 can be screws. The first metal member 134 can be formed with a plurality of penetrating holes 134c. The second metal member 135 can be formed with a plurality of penetrating holes 135c. An end surface of the second portion 133b facing toward the first metal member 134 and second metal member 135 can be formed with a plurality of threaded holes (not shown). The number of the penetrating holes 134c, the penetrating holes 135c and the threaded holes can be corresponding to the number of the fastening elements 137. As such, the fastening element 137 can insert through the penetrating hole 134c and the penetrating hole 135c, and locked into the threaded hole 137 of the second portion 133b, which allows the first metal member 134 and the second metal member 135 to be fixed on the bushing 133 and be moved synchronously with the bushing 133 and the nut 122. Moreover, the portion of the first metal member 134 and the second metal member 135 beyond the bushing 133 can be minimized whether along the axial direction A or a radial direction of the thread shaft 124, which can reduce the volume occupied by the motor 130. Moreover, due to the view angle, only a portion the fastening element 137 is shown in FIG. 2. In FIG. 3, for the sake of simplification, only two fastening elements 137 are shown, and the rest of the fastening elements 137 are omitted. The first metal member 134 includes a first central portion 134a and a plurality of first wing portions 134b. Herein, the number of the first wing portions 134b is five, which is only exemplary. The second metal member 135 includes a second central portion 135a and a second wing portion 135b. The plurality of first wing portions 134b are equally spaced and connected to an outer circumferential surface 134d of the first central portion 134a. The second wing portion 135b is formed in a sector shape and is connected to an outer circumferential surface 135d of the second central portion 135a.

The angular position sensor 140 includes a first sensing unit 142 and a second sensing unit 144. The first sensing unit 142 has a first through hole 143 corresponding to the first wing portions 134b. The second sensing unit 144 has a second through hole 145 corresponding to the second wing portion 135b. An outer diameter D3 of the first central portion 134a is less than a hole diameter H1 of the first through hole 143 of the first sensing unit 142. An outer diameter D4 of the second central portion 135a is less than a hole diameter H2 of the second through hole 145 of the second sensing unit 144, such that the first central portion 134a and the second central portion 135a are disposed in the first through hole 143 of the first sensing unit 142 and the second through hole 145 of the second sensing unit 144.

Furthermore, when the first metal member 134 is assembled with the second metal member 135, the first central portion 134a is connected with the second central portion 135a to form a central portion (not labeled). In the embodiment, the central angle formed by the second wing portion 135b and a central axis of the second central portion 135a is 180 degrees, and the plurality of the first wing portions 134b are equally spaced. As such, the first wing portions 134b and the second wing portion 135b are arranged with different spacing angles, which allows the measuring range of the sensing signal of first sensing unit 142 to be different from that of the second sensing unit 144. Accordingly, it is favorable for the computing unit 160 to calculate based on a vernier algorithm and an angle follower algorithm. Details of the algorithms are recited below.

When assembling the motor 130, the first sensing unit 142 is corresponding to the first metal member 134, the second sensing unit 144 is corresponding to the second metal member 135, and the first central portion 134a and the second central portion 135a are respectively disposed in the first through hole 143 of the first sensing unit 142 and the second through hole 145 of the second sensing unit 144. With the arrangement, when the first metal member 134 and the second metal member 135 are moved synchronously with the nut 122, the first sensing unit 142 can sense a rotating angle of the first metal member 134 via a magnetic signal or a light reflection signal and output a first sensing signal S1, and the second sensing unit 144 can sense a rotating angle of the second metal member 135 via a magnetic signal or a light reflection signal and output a second sensing signal S2. Then the computing unit 160 calculates a position of the threaded shaft 124 along the axial direction A based on the first sensing signal S1 and the second sensing signal S2. As such, an accurate tire angle can be obtained, and the vehicle can be turned accurately. Furthermore, the first central portion 134a and the second central portion 135a are disposed in the first through hole 143 of the first sensing unit 142 and the second through hole 145 of the second sensing unit 144, the components can be assembled more compactly, which is favorable for reducing the volume of the electric power steering system 100.

Furthermore, in the embodiment, a maximum outer diameter D5 of the first metal member 134 is less than the hole diameter H2 of the second through hole 145. When assembling the electric power steering system 100, the first sensing unit 142 and the second sensing unit 144 can be fixed in the housing 110 in advance. Then the first metal member 134 and the second metal member 135 are disposed around the first portion 133a and fastened on the second portion 133b along the axial direction A. Afterwards, the first portion 133a of the bushing 133 and the first metal member 134 are passed through the second through hole 145 of the second sensing unit 144. Because the maximum outer diameter D5 of the first metal member 134 is less than the hole diameter H2 of the second through hole 145, the first metal member 134 can be passed through the second through hole 145 easily disposed between the first sensing unit 142 and the second sensing unit 144, such that the first sensing unit 142 and the second sensing unit 144 are corresponding to the first metal member 134 and the second metal member 135, respectively. Accordingly, the purpose of easy assembling can be achieved.

Figure 5:
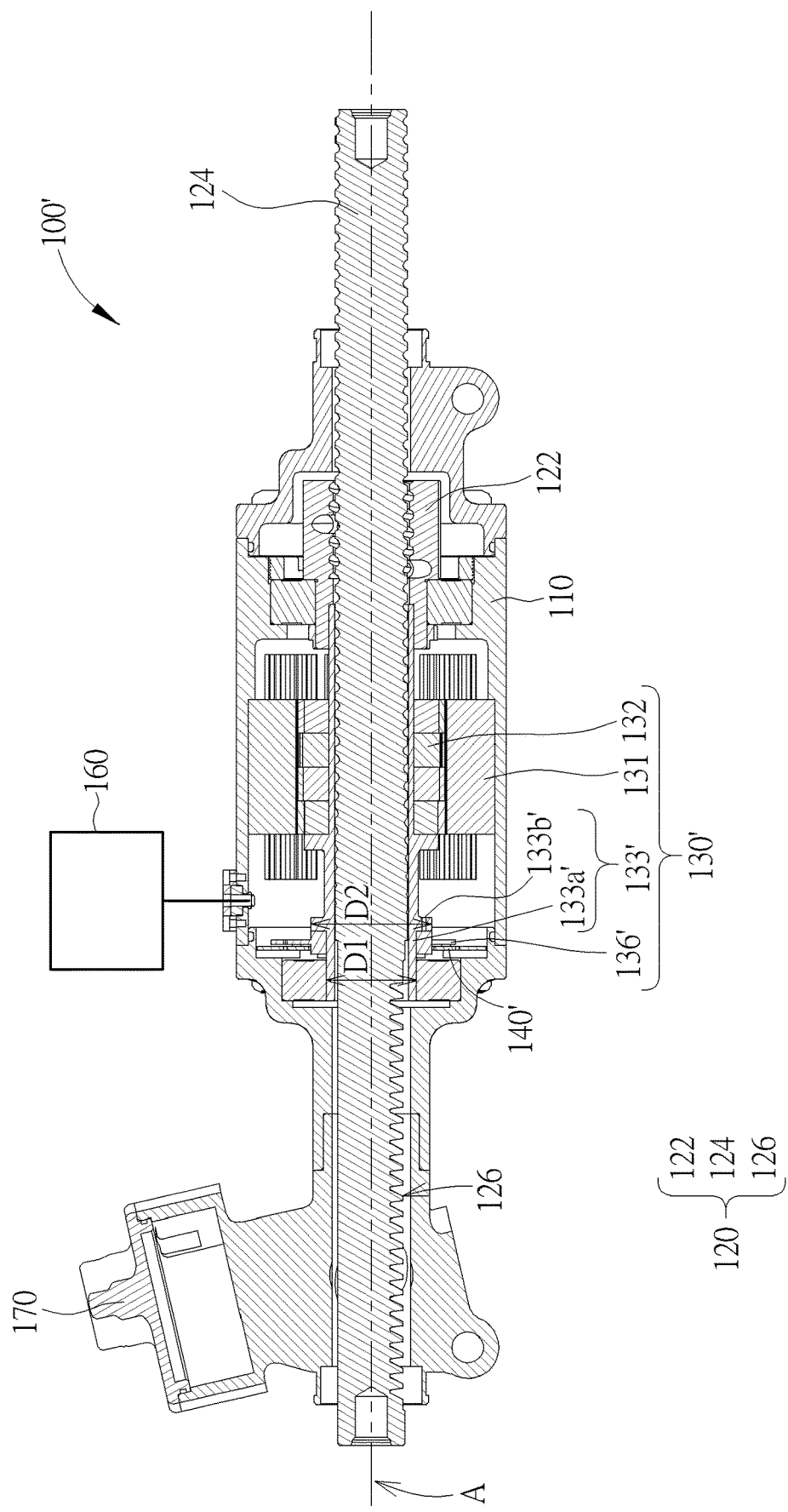
FIG. 5 is a cross-sectional view of an electric power steering system along an axial direction according to another embodiment of the present disclosure.
Figure 6:
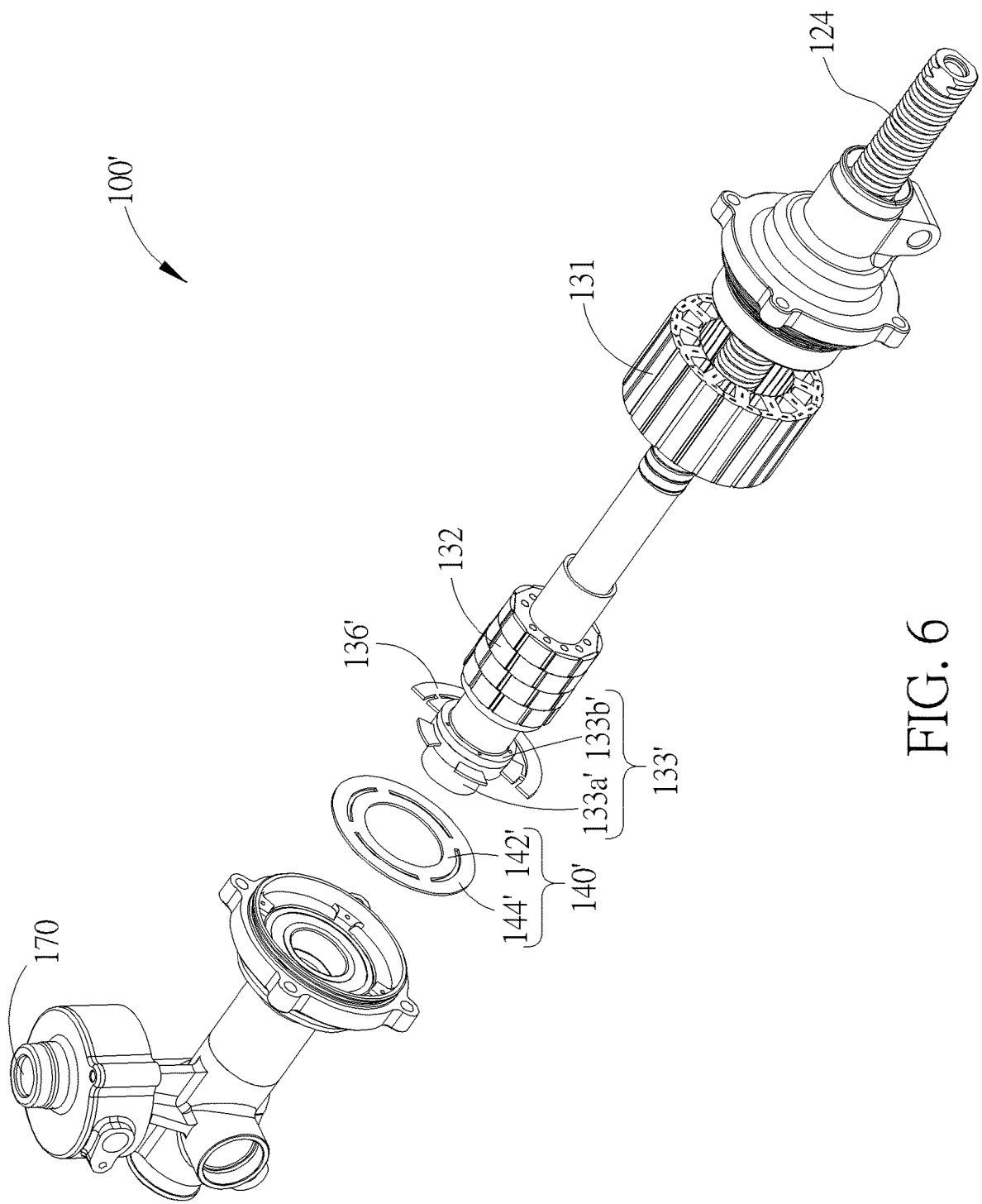
FIG. 6 is a schematic diagram showing internal components of the electric power steering system shown in FIG. 5 by removing a partial of a housing.
Figure 7:
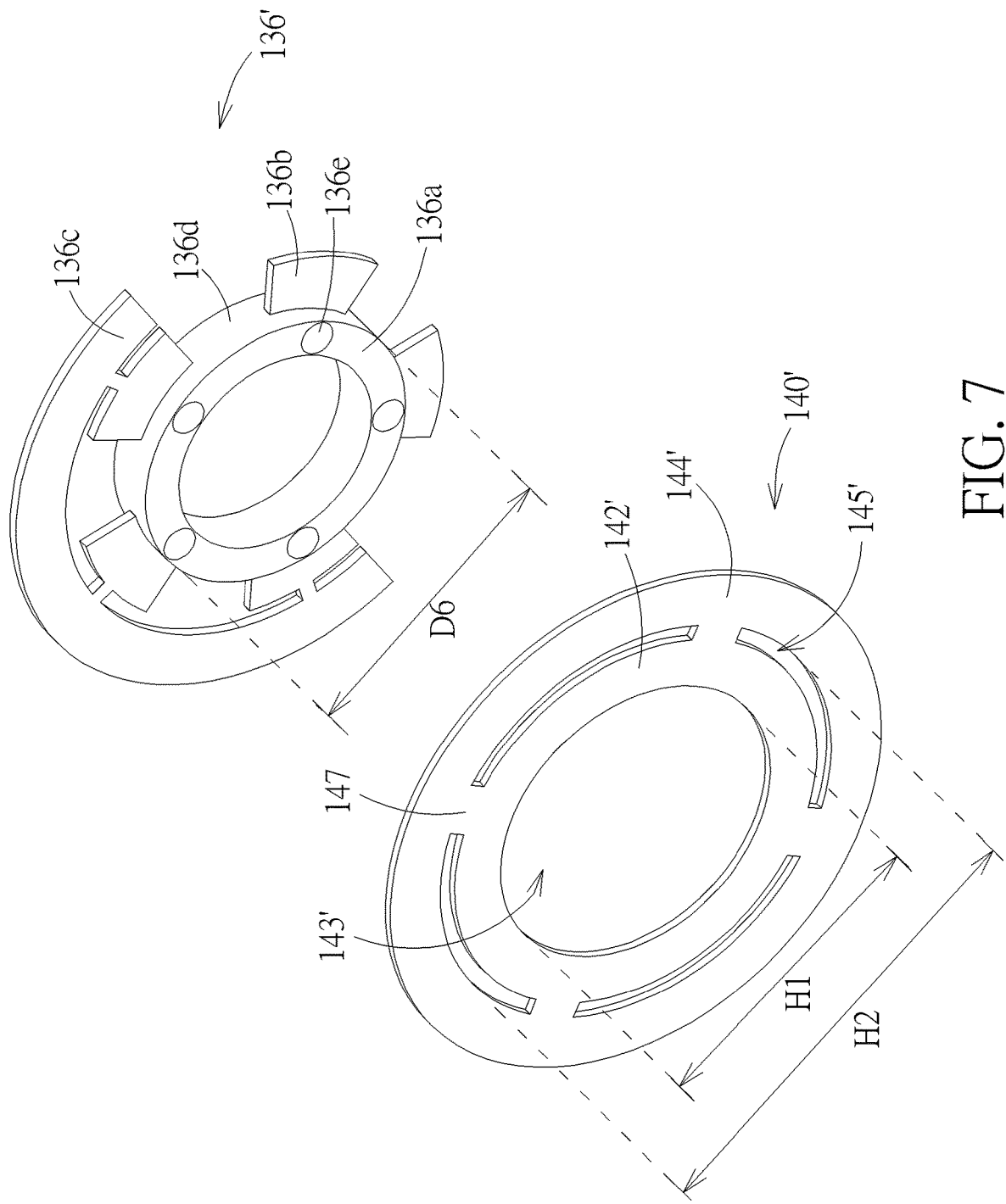
FIG. 7 is a schematic diagram showing an angular position sensor and a metal component shown in FIG. 6.

Please refer to FIG. 5 to FIG. 7. FIG. 5 is a cross-sectional view of an electric power steering system 100' along an axial direction A according to another embodiment of the present disclosure. FIG. 6 is a schematic diagram showing internal components of the electric power steering system 100' shown in FIG. 5 by removing a partial of a housing 110, and the internal components are shown in an exploded state. FIG. 7 is a schematic diagram showing an angular position sensor 140' and a metal component 136' shown in FIG. 6. In the electric power steering system 100' according to the embodiment, the metal component 136 ' is fixed on the bushing 133'. The metal component 136' includes a central portion 136a, a plurality of first wing portions 136b and a second wing portion 136c. The first wing portions 136b and the second wing portion 136c are disposed on an outer circumferential surface 136d of the central portion 136a. Specifically, the number of the first wing portions 136b is five, which is only for exemplary. The plurality of first wing portions 136b are equally spaced and connected to the outer circumferential surface 136d of the central portion 136a. The second wing portion 136c is formed in a sector shape, and a central angle formed by the second wing portion 136c and a central axis of the central portion 136a is 180 degrees. The second wing portion 136c surrounds the first wing portion 136b, and an inner side of the second wing portion 136c is connected to an outer side of each of the first wing portions 136b along a radial direction. In other words, the first wing portions 136b are located between the central portion 136a and the second wing portion 136c, and connect the central portion 136a to the second wing portion 136c.

The angular position sensor 140' includes a first sensing unit 142', a second sensing unit 144' and a plurality of connecting portions 147. Herein, the number of the connecting portions 147 is four, which is only exemplary. The first sensing unit 142' has a first through hole 143' corresponding to the first wing portions 136b. The second sensing unit 144' has a second through hole 145' corresponding to the second wing portion 136c. The first sensing unit 142' is disposed in the second through hole 145', the connecting portions 147 are connected between the first sensing unit 142' and the second sensing unit 144'. In other words, the range of the second through hole 145' covers the range of the first through hole 143'. An outer diameter D6 of the central portion 136a is less than a hole diameter H1 of the first through hole 143', and the outer diameter D6 of the central portion 136a is less than a hole diameter H2 of the second through hole 145'. As such, the central portion 136a is disposed in the first through hole 143' and the second through hole 145'. The main difference between the electric power steering system 100' and the aforementioned electric power steering system 100 is as follows. The angular position sensor 140 of the electric power steering system 100 includes two independent components, i.e., the first sensing unit 142 and the second sensing unit 144. The angular position sensor 140' of the electric power steering system 100' is a single component. The metal component 136 of the electric power steering system 100 includes two independent components, i.e., the first metal member 134 and second metal member 135. The metal component 136' of the electric power steering system 100' is a single component. As such, the overall structure of the electric power steering system 100' can be simplified, and the interference when assembling the angular position sensor 140' and the metal component 136' can be reduced.

When assembling the motor 130', the metal component 136' and the central portion 136a are disposed in the first through hole 143', and the first sensing unit 142' and the second sensing unit 144' are corresponding to the first wing portions 136b and the second wing portion 136c, respectively. As such, the first sensing unit 142' and the second sensing unit 144' can respectively sense rotating angles of the first wing portions 136b and the second wing portion 136c, and can respectively output a first sensing signal S1 and a second sensing signal S2. In the embodiment, the second wing portion 136c is formed in a sector shape, and a central angle formed by the second wing portion 136c and a central axis of the central portion 136a is 180 degrees. The plurality of the first wing portions 134b are equally spaced. As such, the second wing portion 136c and the first wing portions 136b are arranged with different spacing angles, which allows the measuring range of the sensing signal of first sensing unit 142' to be different from that of the second sensing unit 144'. Accordingly, it is favorable for the computing unit 160 to calculate based on an algorithm. Comparing the motor 130' to the motor 130, the axial gap between the first sensing unit 142 and the second sensing unit 144 is reduced, and the axial gap between the first metal member 134 and the second metal member 135 is also reduced. Accordingly, the volume of the motor 130' occupied in the electric power steering system 100' can be reduced.

Similar to the electric power steering system 100, the bushing 133' has a first portion 133a' and a second portion 133b'. An outer diameter D1 of the first portion 133a' is less than an outer diameter D2 of the second portion 133b'. The metal component 136' is fixed on the second portion 133b' through at least one fastening element (not shown), and the metal component 136b' surrounds the first portion 133a'. Specifically, the metal component 136b' can be formed with a plurality of penetrating holes 136e for being inserted by the fastening elements. An end surface of the second portion 133b' facing toward the metal component 136' can be formed with a plurality of threaded holes (not shown) for being locked by the fastening elements. Details of the fastening elements can refer to the that described in FIG. 3. Therefore, in the electric power steering system 100', the portion of the metal component 136b' beyond the bushing 133' also can be minimized, which can reduce the volume occupied by the motor 130'.

Furthermore, the outer diameter D6 of the central portion 136a of the metal component 136' is less than the hole diameter H1 of the first through hole 143'. When assembling the electric power steering system 100', the angular position sensor 140' formed by the first sensing unit 142' and the second sensing unit 144' can be fixed in the housing 110 in advance. Then the first portion 133a' of the bushing 133' and the central portion 136a of the metal component 136' are passed through the first through hole 143', such that the first sensing unit 142' and the second sensing unit 144' are corresponding to the first wing portions 136b and the second wing portion 136c, respectively. Accordingly, the purpose of easy assembling can be achieved.

Figure 8:
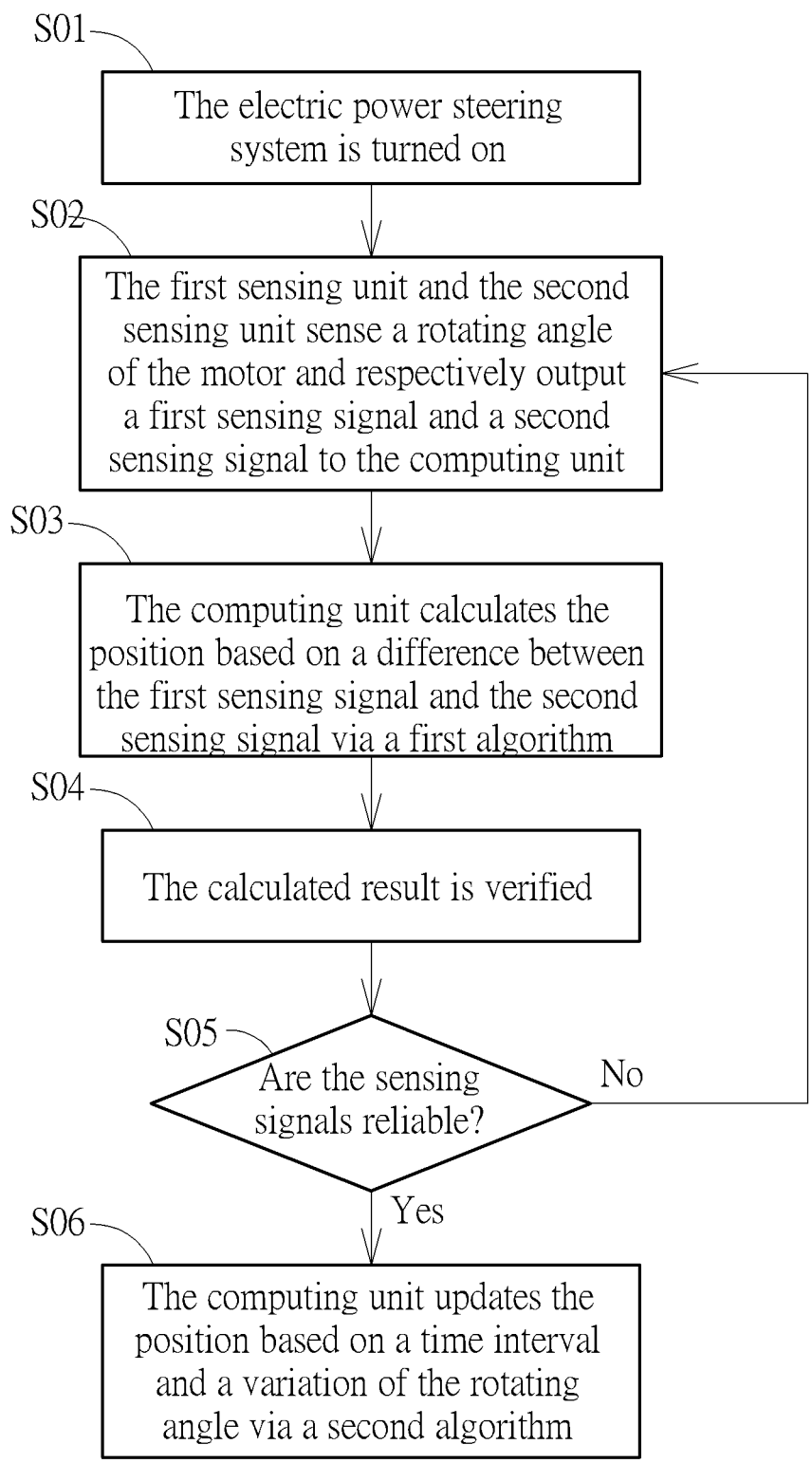
FIG. 8 is a flow chart of a method for calculating a position of a threaded shaft according to yet another embodiment of the present disclosure.

FIG. 8 is a flow chart of a method for calculating the position of the threaded shaft 124 according to yet another embodiment of the present disclosure. Please refer to FIG. 8. Herein, the electric power steering system 100 is used for illustration. In the embodiment, the position of the threaded shaft 124 along the axial direction A is calculated based on the first sensing signal S1 and the second sensing signal S2 outputted by the first sensing unit 142 and the second sensing unit 144 disposed on the motor 130. The steps are illustrated as follows. First, the electric power steering system 100 is turned on (Step S01). When the electric power steering system 100 is turned on, the first sensing unit 142 and the second sensing unit 144 sense the rotating angles of the first metal member 134 and the second metal member 135 to obtain the rotating angle θ of the rotor 132 of the motor 130, then obtain the first sensing signal S1 and the second sensing signal S2, respectively. The first sensing unit 142 and the second sensing unit 144 output the first sensing signal S1 and the second sensing signal S2 to the computing unit 160 (Step S02). The computing unit 160 calculates the position based on a difference d between the first sensing signal S1 and the second sensing signal S2 via a first algorithm (Step S03). In the embodiment, the first algorithm is a vernier algorithm, which can obtain an accurate measuring result by calculating the difference between two sensing signals with different measuring ranges.

Figure 9:
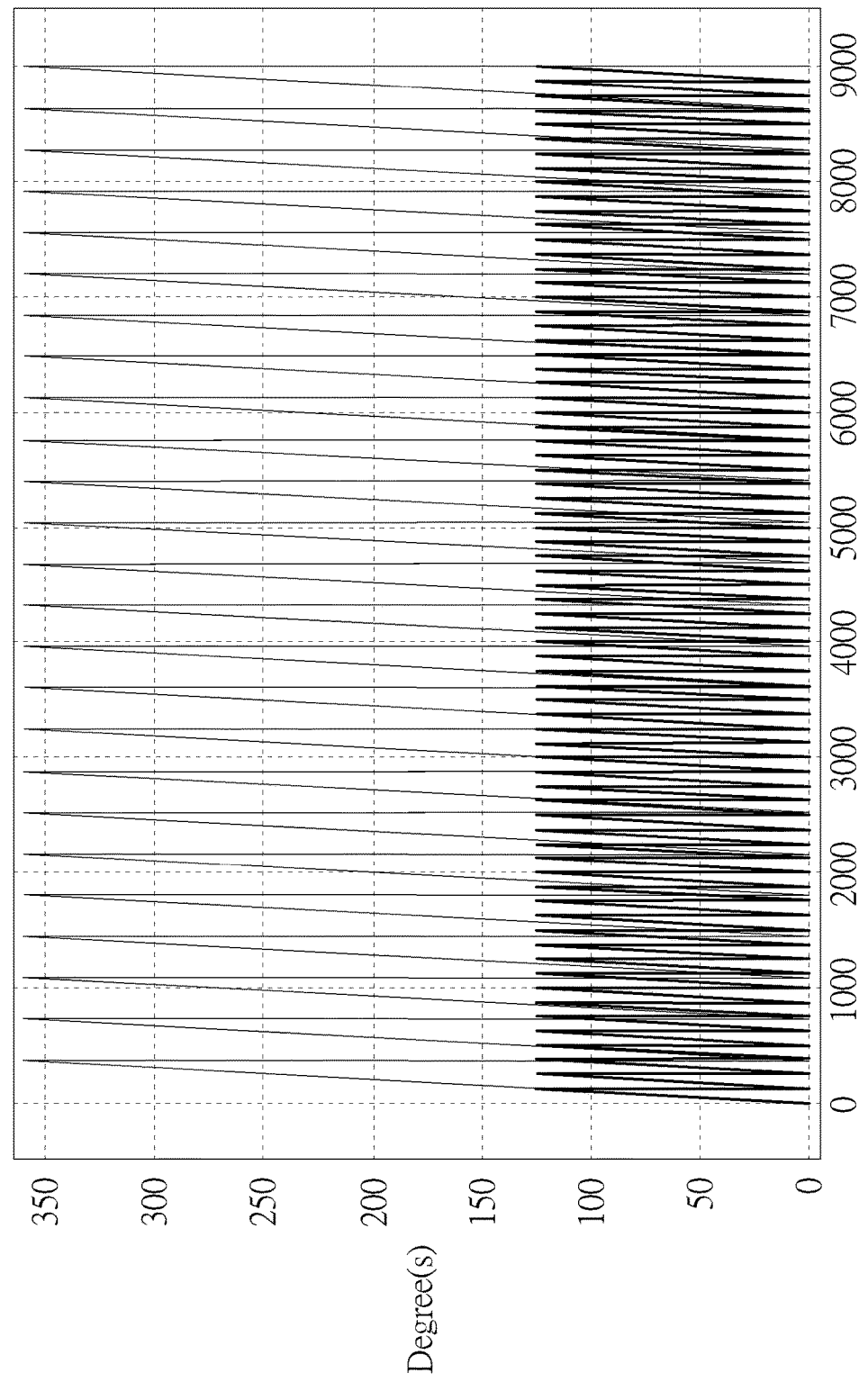
FIG. 9 is a schematic diagram showing a first sensing signal and a second sensing signal respectively obtained by a first sensing unit and a second sensing unit shown in FIG. 8.
Figure 10:
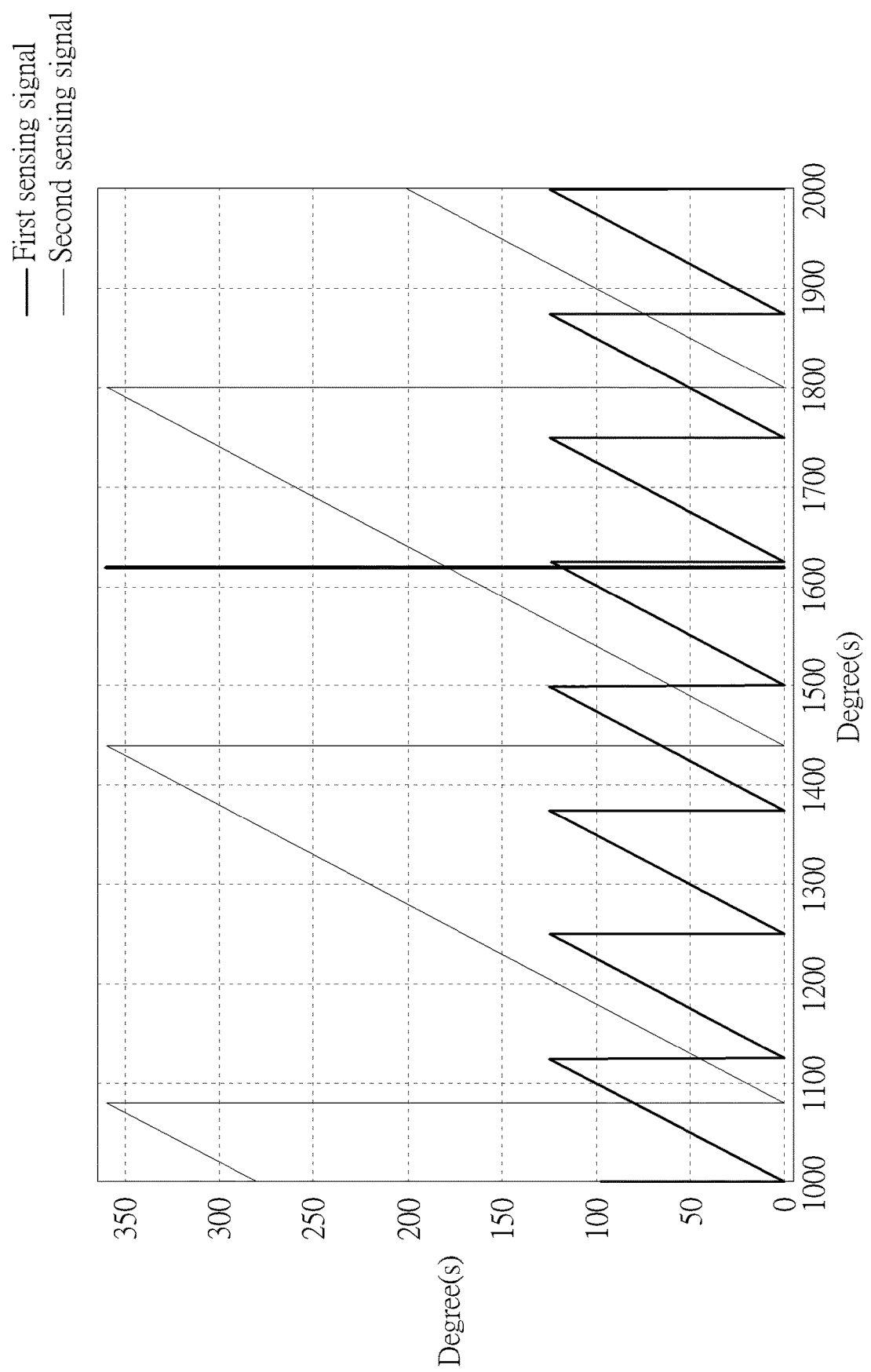
FIG. 10 is a schematic diagram showing the first sensing signal, the second sensing signal and a target angle shown in FIG. 9.
Figure 11:
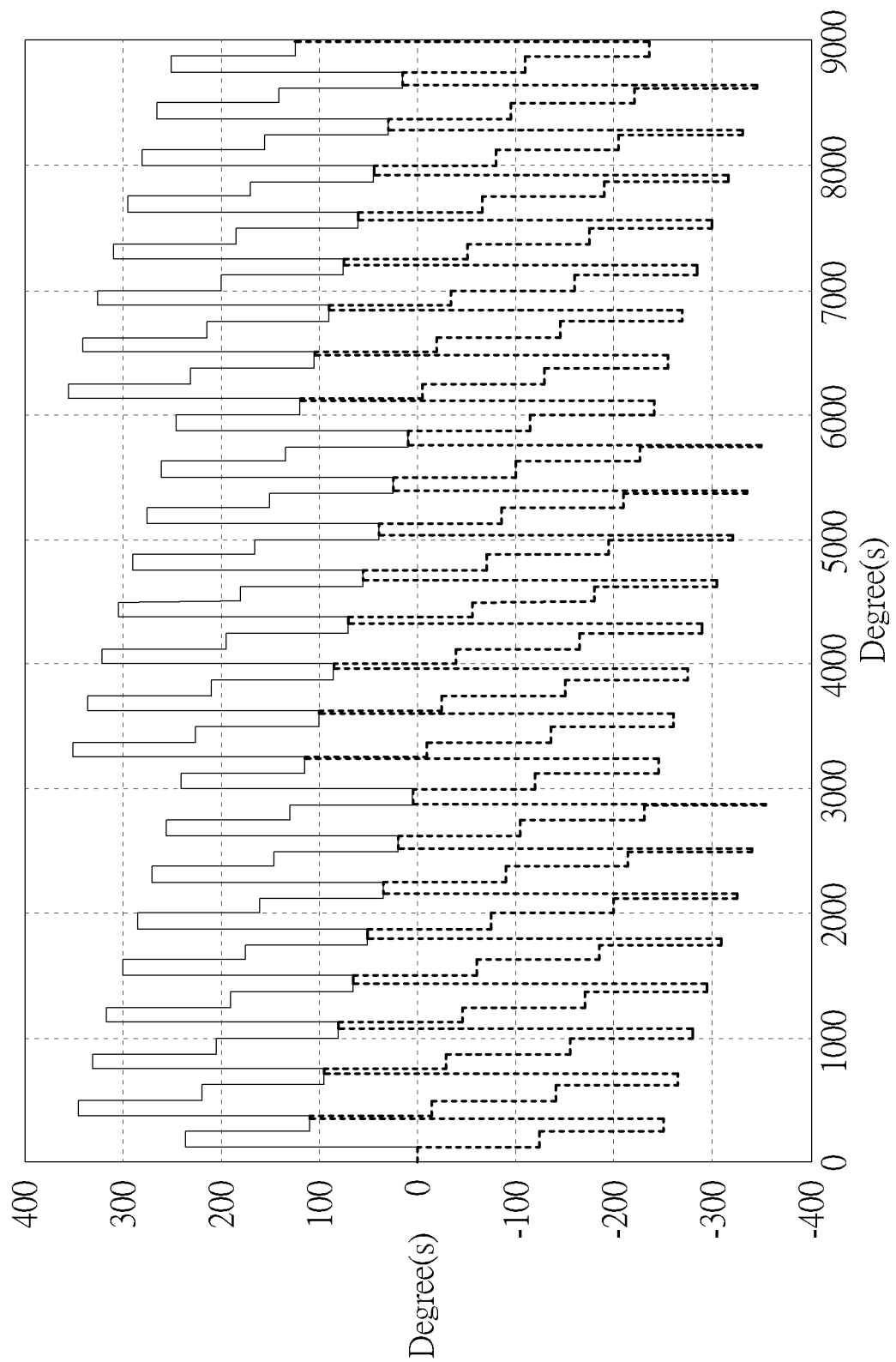
FIG. 11 is a schematic diagram showing a difference between the first sensing signal and the second sensing signal.
Figure 12:
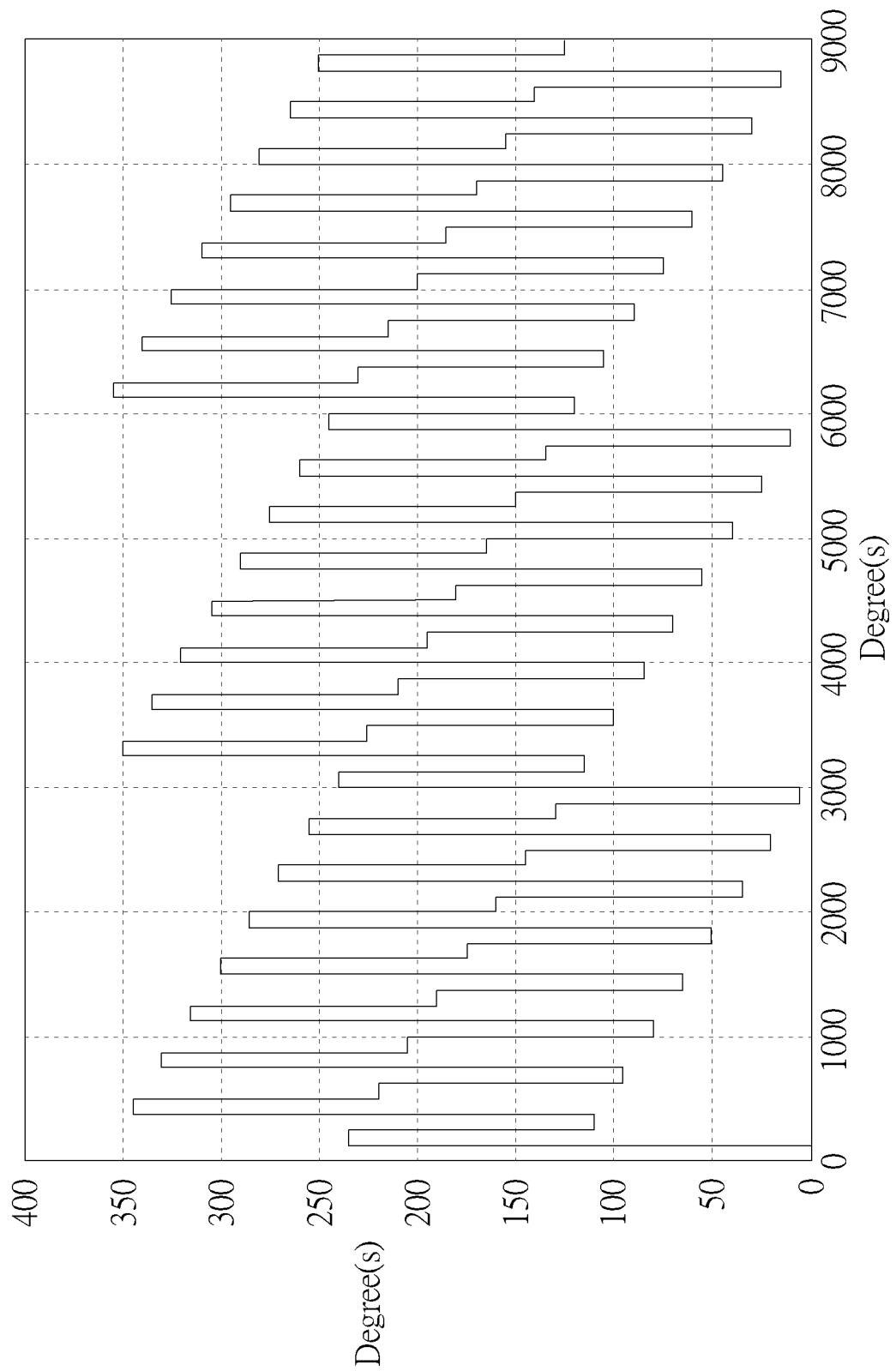
FIG. 12 shows a relationship of a positive value of the difference and a total rotating angle.

Please refer to FIG. 9 to FIG. 12. FIG. 9 is a schematic diagram showing the first sensing signal S1 and the second sensing signal S2 respectively obtained by the first sensing unit 142 and the second sensing unit 144 shown in FIG. 8. FIG. 10 is a schematic diagram showing the first sensing signal S1, the second sensing signal S2 and a target angle shown in FIG. 9. FIG. 11 is a schematic diagram showing a difference between the first sensing signal S1 and the second sensing signal S2. FIG. 12 shows a relationship of a positive value of the difference and a total rotating angle. Specifically, in the embodiment, the range of the total rotating angle of the output shaft 170 (i.e., the total rotating angle of the steering wheel) is assumed to be 0-9000 degrees. The first sensing signal S1 measured by the first sensing unit 142 is corresponding to a first measuring range $R_1$. In the embodiment, the first measuring range $R_1$ is 125 degrees. The second sensing signal S2 measured by the second sensing unit 144 is corresponding to a second measuring range $R_2$. In the embodiment, the second measuring range $R_2$ is 360 degrees. When the measuring target exceeds the first measuring range $R_1$, the first sensing signal S1 will re-increase from 0 degree. Also, when the measuring target exceeds the second measuring range $R_2$, the second sensing signal S2 will re-increase from 0 degree. Moreover, when using the vernier algorithm, the first measuring range $R_1$ must be different from the second measuring range $R_2$. As such, the difference d can be obtained when measuring a same rotating angle.

Please refer to FIG. 10. In the embodiment, the practical moving distance of the threaded shaft 124 is assumed to be 36 mm, and the rotating angle θ of the nut 122 is assumed to be 1620 degrees. Since the rotor 132 and the nut 122 are connected coaxially and are moved synchronously, the rotating angle embodiment, the practical moving distance of the threaded shaft 124 is assume 122. At this point, the first sensing signal S1 is 120 degrees, the second sensing signal S2 is 180 degrees The difference d is −60 degrees (d=S1−S2=−60 degrees). Because the difference d is a negative value, the difference d is required to be transferred to a positive value by adding the second measuring range $R_2$ or via referring to FIG. 11. The positive value of the difference $d_{pos}$ is 300 degrees ($d_{pos}$=−60+$R_2$=300). When the positive value of the difference $d_{pos}$ is obtained, the angle correction amount can be obtained by Table 1 or FIG. 12.

TABLE 1

The relationship of the practical rotating angle, the positive value of the difference and the angle correction amount
(Unit: degrees)

| Lower limit of the practical rotating angle | Upper limit of the practical rotating angle | positive value of the difference | angle correction amount |
|---|---|---|---|
| 0 | 124 | 0 | 0 |
| 125 | 249 | 235 | 125 |
| 250 | 374 | 110 | 250 |
| 375 | 499 | 345 | 375 |

TABLE 1-continued

The relationship of the practical rotating angle, the positive value of the difference and the angle correction amount
(Unit: degrees)

| Lower limit of the practical rotating angle | Upper limit of the practical rotating angle | positive value of the difference | angle correction amount |
|---|---|---|---|
| 500 | 624 | 220 | 500 |
| 625 | 749 | 95 | 625 |
| 750 | 874 | 330 | 750 |
| 875 | 999 | 205 | 875 |
| 1000 | 1124 | 80 | 1000 |
| 1125 | 1249 | 315 | 1125 |
| 1250 | 1374 | 190 | 1250 |
| 1375 | 1499 | 65 | 1375 |
| 1500 | 1624 | 300 | 1500 |
| 1625 | 1749 | 175 | 1625 |
| 1750 | 1874 | 50 | 1750 |
| 1875 | 1999 | 285 | 1875 |
| 2000 | 2124 | 160 | 2000 |
| (omitted) | (omitted) | (omitted) | (omitted) |
| 8500 | 8624 | 140 | 8500 |
| 8625 | 8749 | 15 | 8625 |
| 8750 | 8874 | 250 | 8750 |
| 8875 | 8999 | 125 | 8875 |

According to Table 1 or FIG. 12, there are 72 different positive values of the difference $d_{pos}$, and the total measuring range (9000 degrees are divided into 72 areas. In the embodiment, the practical rotating angle Because the difference d is a negative value, the difference d is required to be transhich can be obtained from the positive value of the difference, $d_{pos}$=300 degrees. Therefore, the practical rotating angle θ can be obtained by the following equation:

$$\theta_{actual} = \theta_{correction} + S1$$

In the equation, the $\theta_{actual}$ is the practical rotating angle of the nut 122, and the $\theta_{correction}$ is the angle correction amount. As such, the practical rotating angle θ is 1620 degrees (1500+120=1620). The angle correction amount can be regarded as the product of the angle range of a single area (125 degrees) and the number of the area intervals (13−1=12).

When the practical rotating angle θ of the nut 122 is obtained via the first algorithm, the position of the threaded shaft 124 along the axial direction A can be calculated by the linear-angle ratio. By this time, the calculated result can be verified by the computing unit 160 (S04), i.e., the computing unit 160 can confirm whether the sensing signals are abnormal, such as having obvious fluctuations or exceeding the measuring range. If the first sensing signal S1 and the second sensing signal S2 are reliable and have no obvious abnormalities (Step S05). The computing unit 160 uses the obtained rotating angle θ as an initial value, and updates the rotating angle θ and the position of the threaded shaft 124 based on the following time interval t and a variation A of the rotating angle θ via a second algorithm (Step S06). In the embodiment, the second algorithm is an angle follower algorithm, which is based on the principle of integration and updates the rotating angle θ by adding the sum of the angle variation A at the time interval t to the initial value obtained by the first algorithm to update the rotating angle ti Furthermore, when the first sensing signal S1 or the second sensing signal S2 is abnormal, or when the electric power steering system 100 is restarted, the computing unit 160 rereads the first sensing signal S1 and the second sensing signal S2 outputted by the first sensing unit 142 and the second sensing unit 144 and repeats the aforementioned steps.

To sum up, the electric power steering system according to the present disclosure can obtain the first sensing signal and the second sensing signal via the first sensing unit and the second sensing unit disposed in the housing, and the position of the threaded shaft along the axial direction can be calculated. As such, the problem that the position of the threaded shaft cannot be obtained easily due to lack of the input shaft can be solved. Furthermore, because the input shaft and the sensing unit disposed thereon can be omitted, the volume occupied by the components and the cost can be significantly reduced. Moreover, the electric power steering system can be applied to a variety of vehicles, and thus is featured with enhanced function and convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electric power steering system, comprising:
   a housing;
   a ball screw comprising a nut and a threaded shaft, wherein the threaded shaft is moved along an axial direction through the nut being rotated;
   a motor disposed in the housing and connected to the nut, the motor being configured to drive the nut to rotate, the motor comprising:
      a bushing disposed on the threaded shaft and moved synchronously with the nut; and
      a metal component fixed on the bushing, the metal component comprising a central portion, a first wing portion and a second wing portion, the first wing portion and the second wing portion being disposed on an outer circumferential surface of the central portion;
   an angular position sensor disposed in the housing and fixed relative to the housing, the angular position sensor comprising:
      a first sensing unit having a first through hole corresponding to the first wing portion; and
      a second sensing unit having a second through hole corresponding to the second wing portion; and
   a computing unit electrically connected to the first sensing unit and the second sensing unit;
   wherein an outer diameter of the central portion is less than a hole diameter of the first through hole, the outer diameter of the central portion is less than a hole diameter of the second through hole, such that the central portion is disposed in the first through hole and the second through hole;
   wherein when the electric power steering system is turned on, the first sensing unit and the second sensing unit sense a rotating angle of the motor and respectively output a first sensing signal and a second sensing signal to the computing unit, and the computing unit calculates a position of the threaded shaft along the axial direction based on the first sensing signal and the second sensing signal.

2. The electric power steering system of claim 1, wherein the metal component comprising:
   a first metal member comprising a first central portion and the first wing portion, the first wing portion being connected to an outer circumferential surface of the first central portion, an outer diameter of the first central portion is less than the hole diameter of the first through hole, such that the first central portion is disposed in the first through hole; and
   a second metal member comprising a second central portion and the second wing portion, the second wing portion being connected to an outer circumferential surface of the second central portion, an outer diameter of the second central portion is less than the hole diameter of the second through hole, such that the second central portion is disposed in the second through hole;
   wherein the first central portion is connected with the second central portion to form the central portion.

3. The electric power steering system of claim 1, wherein the first sensing unit is disposed in the second through hole, the angular position sensor further comprises a connecting portion connected between the first sensing unit and the second sensing unit.

4. The electric power steering system of claim 1, wherein the bushing comprises a first portion and a second portion, an outer diameter of the first portion is less an outer diameter of the second portion, the metal component is fixed on the second portion through a fastening element, and the metal component surrounds the first portion.

5. The electric power steering system of claim 1, wherein the motor is a hollow torque motor and comprises a stator and a rotor, the rotor is coaxial and moved synchronously with the nut, the stator is fixed relative to the housing, and the threaded shaft is disposed through the nut.

6. The electric power steering system of claim 1, wherein the first sensing signal and the second sensing signal are respectively corresponding to a first measuring range and a second measuring range, the first measuring range is different from the second measuring range, the computing unit calculates the position based on a difference between the first sensing signal and the second sensing signal via a first algorithm, and the computing unit updates the position based on a time interval and a variation of the rotating angle via a second algorithm.

7. The electric power steering system of claim 2, wherein a maximum outer diameter of the first metal member is less than the hole diameter of the second through hole.

* * * * *